EDWARD G. OBEDA
INVENTOR.

BY:
Erwin B. Steinberg

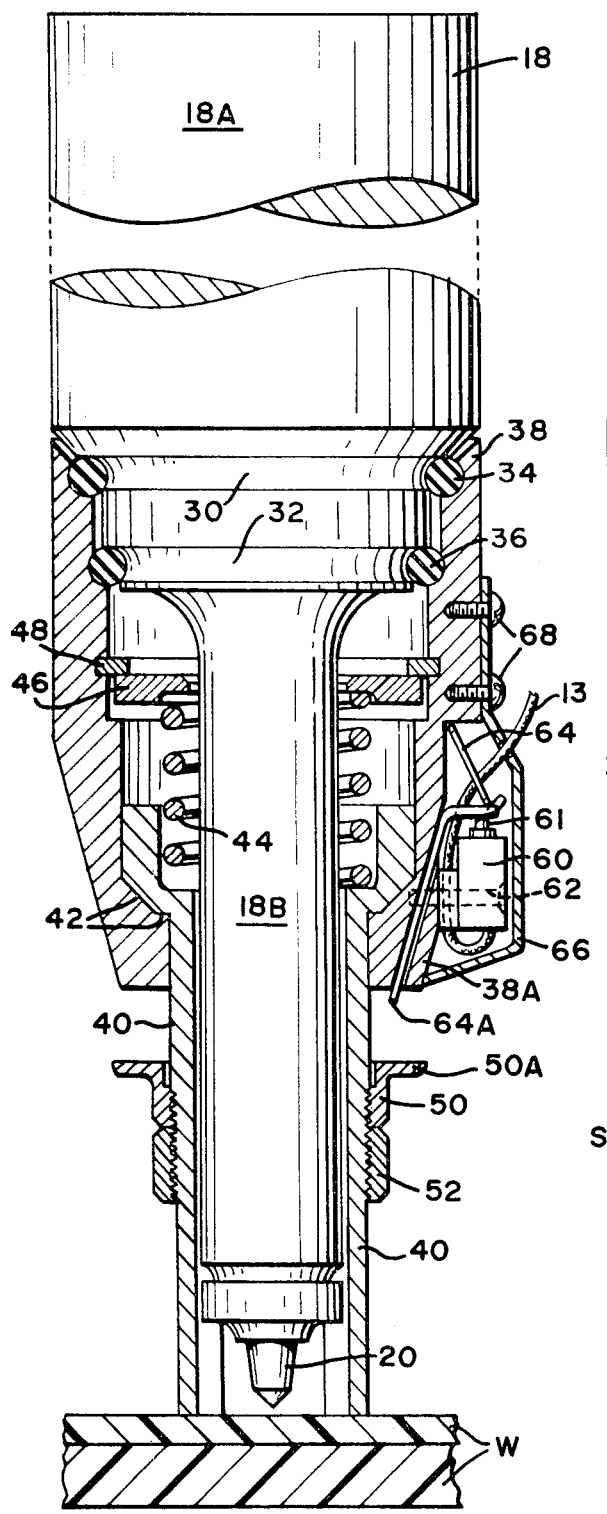

United States Patent Office 3,649,420
Patented Mar. 14, 1972

3,649,420
SONIC APPARATUS WITH ELECTRICAL
CIRCUIT MEANS
Edward G. Obeda, Brookfield, Conn., assignor to Branson
Instruments, Incorporated, Stamford, Conn.
Filed Apr. 13, 1970, Ser. No. 28,352
Int. Cl. B29c 27/08; B32b 31/16
U.S. Cl. 156—580
12 Claims

ABSTRACT OF THE DISCLOSURE

A sonic apparatus adapted for spot welding thermoplastic parts is provided with mechanical depth control means and an electrical switch for interrupting the current flow and thereby stopping the dissipation of sonic energy when a predetermined depth of tool penetration within the workpiece has been achieved.

---

This invention is related to copending application for U.S. Letters Patent, Ser. No. 742,312, in the name of Stephen Fesh, filed July 3, 1968, entitled "Method for Welding Thermoplastic Parts by Sonic Energy," now U.S. Pat. No. 3,563,822 issued Feb. 16, 1971. The present application is related, moreover, to my copending application for U.S. Letters Patent, Ser. No. 801,658, filed Feb. 24, 1969, entitled "Tool for Joining Thermoplastic Parts by Sonic or Ultrasonic Energy."

In the patent application to Stephen Fesh supra there is disclosed an apparatus and method for accomplishing bonding between two thermoplastic parts using an ultrasonic spot welding method. Specifically, a tool operating in the sonic or ultrasonic frequency range is applied to an exposed surface of two superposed thermoplastic parts, and while undergoing high frequency vibrations the tool is urged to penetrate through the surface of the uppermost part and pass toward the interface surface along which both parts are in juxtaposition. As the tool penetrates and reaches the interface surface, responsive to the dissipation of ultrasonic energy by the thermoplastic parts, thermoplastic material is caused to flow along the interface surface. Upon stopping the dissipation of energy, such as by shutting off the vibrations or by withdrawing the tool from its penetrated position, the flowed and softened material hardens, forming a localized bond or weld.

In the patent application Ser. No. 801,658 supra there is disclosed a device which mechanically limits the penetration of the vibrating tool into the workpiece surface, thus achieving uniform depth of penetration among a series of spot welds. The present invention is a variation of such an arrangement and provides for the interruption of the applied energy when a predetermined depth of penetration is achieved.

Quite specifically, the present invention concerns a sonic or ultrasonic portable spot welding tool which during operation is hand-held and serves for providing spot welds in portions of thermoplastic parts, such parts being superposed upon one another and the spot welds providing a convenient method for bonding such portions to one another. The specific novelty concerns the provision of a control device for interrupting the power flow to the tool when a predetermined depth of pentration has been attained. As used hereafter the word "sonic" shall include frequencies in the ultrasonic frequency range.

One of the principal objects of this invention is, therefore, the provision of a new and improved sonic tool.

Another important object of this invention is the provision of a sonic tool for bonding superposed portions of thermoplastic parts to each other by penetrating through the surface of one of the parts and stopping the power transfer when a predetermined depth of penetration has been achieved.

A further object of this invention is the provision of a sonic tool for joining thermoplastic parts by sonic energy, including control means for controlling the energization of the tool as a function of tool penetration into the workpiece.

Further and still other objects of this invention will be more clearly apparent by reference to the accompanying drawing, in which:

FIG. 2 is an elevational view, partly in section, of the frontal portion of the tool;

FIG. 3 is an elevational view of a portion of FIG. 2, the tool being in its workpiece-penetrated position.

Figure 1:
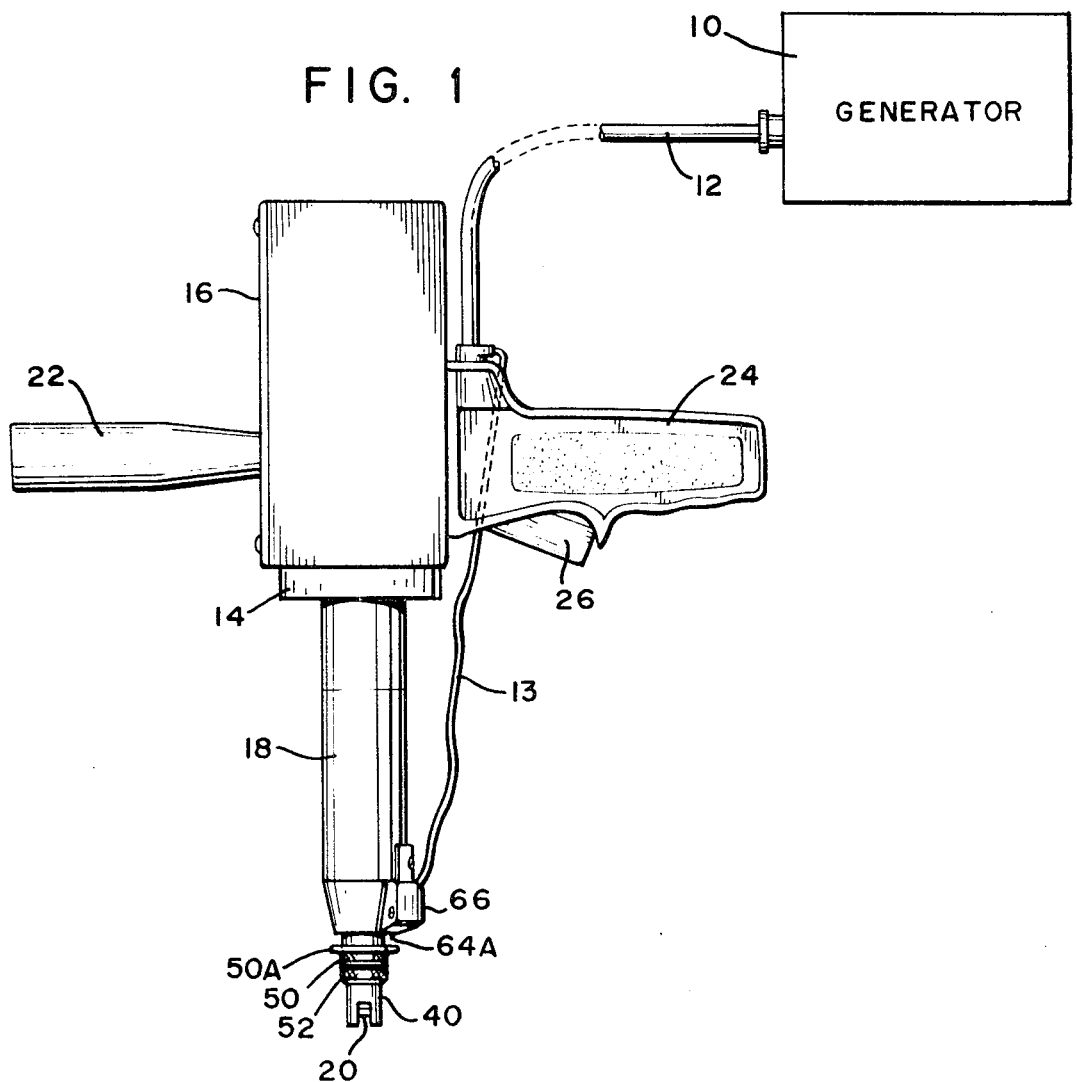
FIG. 1 is a view of the sonic tool and the generator for providing power to the tool.

Referring now to the figures and FIG. 1 in particular, numeral 10 identifies an electrical high frequency generator, typically operating at 20 kHz., and providing electrical energy via cable 12 to a sonic converter 14 which is supported in a housing 16. The converter 14 is fitted with a resonator 18, also known as solid horn, amplitude transformer, concentrator and the like, see "Ultrasonic Engineering" (book) by Julian R. Frederick, John Wiley & Sons, (1965) New York, New York, pp. 87 to 103. The resonator 18 receives the vibration from the converter at an input end and is provided with a pointed output or frontal end 20 which is adapted to be brought into contact with a workpiece. The housing 16 is fitted with a set of handles 22 and 24, the handle 24 being provided with a trigger switch 26. The power supply and tool are available as standard commercial units, the tool itself being available as Pistol Grip Hand Tool, Model GK–1, and the generator as power supply Model J–17A from Branson Sonic Power Company, a division of Branson Instruments, Incorporated, Danbury, Conn. The converter 14 may be constructed as shown in U.S. Pat. No. 3,328,610 issued to S. E. Jacke et al., dated June 27, 1967, entitled "Sonic Wave Generator." As disclosed in the patent the converter contains piezoelectric transducing means for converting the electrical high frequency applied to mechanical vibration which, after being amplified by the resonator 18, is manifest at the output surface 20. The output surface, typically, may oscillate with an amplitude from 0.001 to 0.005 inch, depending upon the resonator configuration. Alternatively, the converter unit 14 may include magnetostrictive transducing means as is well kown to those skilled in the art.

Referring now to FIG. 2, the resonator 18 has a rear portion 18A and a front portion 18B of reduced diameter. The resonator, therefore, exhibits a mechanical amplitude gain as is well known to those skilled in the art. Near the nodal region of longitudinal motion, the resonator is provided with a set of radial grooves 30 and 32, each of which is fitted with a resilient O-ring 34 and 36 respectively. A sleeve 38 has two corresponding internal grooves for engaging the O-rings, thus being retained upon the resonator and, by virtue of the resilient O-rings, the sleeve 38 is acoustically isolated from the resonator 18. A lower sleeve-like member 40 is telescopically fitted within the sleeve 38 and the extended or downward motion of the lower sleeve 40 is limited by the complementary mating surfaces 42 which act as a mechanical stop. A helical coil spring 44 is supported at its lower end by the sleeve member 40 and is supported at its upper end by a retainer 46 which, in turn, is limited in upward motion by an annular snap ring 48 disposed in a groove within the upper sleeve 38. The spring 44 causes the lower sleeve member 40 to be urged toward its extended position. The sleeve-like member 40 may be a complete sleeve or may be provided with a cut-out near its front as is clearly illustrated in FIG. 1. Such a cut-out aids in visually locating the frontal surface 20 of the resonator upon the workpiece W.

In order to limit the retraction of the sleeve-like member 40 into the upper sleeve 38, there are provided two annular rings 50 and 52 which are disposed adjustably on a threaded portion of the sleeve-like member 40. The rings 50 and 52 can be tightened against each other so as to be locked in a fixed position for setting the maximum displacement of the member 40 relative to the sleeve 38.

An electrical circuit switch 60 is secured by means of a screw 62 to the lower portion 38A of the upper sleeve which is mounted in substantially fixed relation to the resonator 18. The switch 60 has an actuating means 61 which is biased so as to be retained normally in its depressed position by means of a hair spring 64 whose upper end rests against a flat underside portion of the sleeve 38 and whose lower end 64A after being fed through an aperture of the sleeve 38 protrudes from the lower end of the sleeve 38.

The switch 60 is covered by an enclosure 66 which is fastened to the sleeve 38 by means of screws 68.

Operation of the sonic tool may be visualized as follows:

The switch 60 has a normally open contact, but the contact is held closed by the force of the hair spring 64. Referring now also to FIGS. 1 and 3, the sonic tool is set on the workpiece W so that the output surface 20 of the resonator 18 is adapted to engage the workpiece at the desired location. The underside of the movable sleeve member 40 rests on the exposed top surface of the workpiece W. Upon squeezing the trigger switch 26, the generator 10 is energized, causing the output end 20 of the resonator 18 to undergo vibration. Upon urging the output surface 20 into the workpiece toward the interface surface S along which the two workpieces are juxtaposed, the workpiece, being of thermoplastic material, dissipates sonic energy and the frontal surface 20 of the resonator sinks into the workpiece W. As the frontal surface 20 penetrates into the workpiece, the sleeve-like member 40 is caused to retract against the force exerted by the helical coil springs 44 into the stationary sleeve 38. The rings 50 and 52 are carried upward, toward contact with the underside of the sleeve 38.

As the frontal surface 20 is urged toward the interface surface S and the sleeve-like member 40 retracts the upper horizontal flange 50A of the ring 50 is brought toward engagement with the lower end 64A of the air spring 64. Shortly thereafter the ring 50 lifts spring 54 from the actuating member 61 of the switch 60, see FIG. 3, causing the switch contact to open and thereby breaking the electrical circuit to the generator, see FIG. 4. Further motion of the horn is stopped almost immediately by virtue of the flange 50A abutting against the underside of the sleeve 38. Upon opening switch 60 the resonator oscillations stop and the tool is briefly held in place in order to permit the softened and flowed thermoplastic material to harden which occurs very quickly. During this dwell time it is preferred that pressure on the workpiece W is maintained by means of steady pressure on the handles 22 and 24 which, in turn, causes the sleeve-like member 40 to press against the upper surface of the workpiece.

The tool subsequently can be withdrawn in two ways. One method is to release the trigger switch 26 and withdraw the tool. In other cases, it has been found advantageous to retain the trigger switch 26 in its squeezed position and withdrawing the tool from engagement with the workpiece. As the tool is lifted out, the spring 64 reactivates the switch 60, causing the resonator to undergo oscillation. This restarting of the resonator breaks friction and facilitates the removal of the tool, similar to a conventional drill or reamer which can be more readily withdrawn from a hole when undergoing motion.

It will be readily aparent that the switch 60 in conjunction with the sleeve-like member 40, sleeve 38, and rings 50 and 52 serves to control the depth of penetration, since the arrangement shown heretofore provides mechanical depth control and additionally causes the sonic power dissipation to stop when a predetermined depth of penetration has been achieved. Moreover, the switch 60 in conjunction with the mechanical depth control means automatically reestablishes oscillation of the resonator during the withdrawal cycle of the tool.

Upon withdrawal of the resonator from the workpiece, the softened, flowed and then hardened thermoplastic material provides a bond across the interface surface S at the location engaged by the output surface 20. This is clearly illustrated in the patent application of Stephen Fesh supra.

Figure 4:
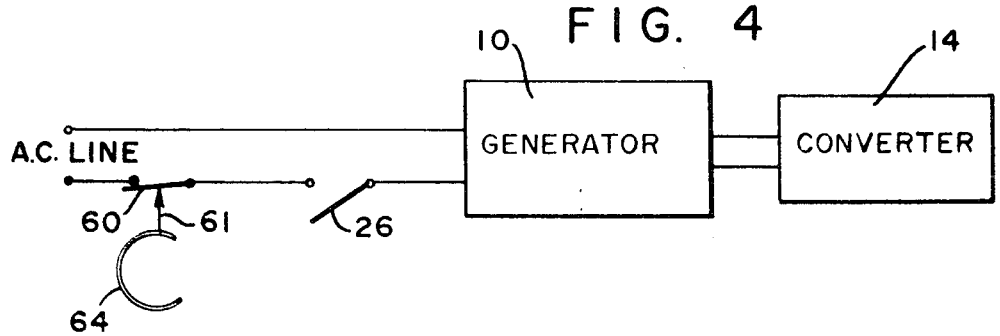
FIG. 4 is a schematic illustration of the electrical circuit diagram.

Electrical connection between the switch 60 and the generator 10 is provided by electrical conductors 13 which connect the switch contact in series with the trigger switch 26, see FIGS. 1 and 4.

What is claimed is:

1. A sonic apparatus comprising:

a solid resonator having an input surface and an output surface, and being adapted to be resonant at a predetermined high frequency along its longitudinal axis when receiving vibrations of such frequency at its input surface;

means coupled for imparting vibrations of said predetermined frequency to said input surface;

said output surface being shaped to penetrate into a workpiece responsive to force contact between said output surface and workpiece and the dissipation of sonic energy by the workpiece;

means movable responsive to the pentration of said output surface into the workpiece coupled to said resonator, and control means disposed for being actuated responsive to the motion of said movable means and connected in circuit with said means for imparting vibrations for controlling said latter means in response to the depth of penetration of said output surface into the workpiece.

2. A sonic apparatus as set forth in claim 1, said control means being disposed and connected for interrupting the imparting of vibrations when a predetermined depth of penetration by said output surface in the workpiece is achieved.

3. A sonic apparatus as set forth in claim 2, said control means being an electrical switch mechanically supported in fixed relation relative to said output surface.

4. A sonic apparatus as set forth in claim 1, said means coupled to said resonator and being movable comprising a sleeve-like member adapted to contact the surface of the workpiece and rest thereupon as the output surface of said resonator penetrates into the workpiece, and the relative displacement between said sleeve-like member and said resonator when of sufficient magnitude causing actuation of said control means.

5. A sonic apparatus as set forth in claim 4, and means disposed in coacting relation with said member for adjusting the magnitude of said relative displacement causing actuation of said control means.

6. A sonic apparatus as set forth in claim 1, said control means being an electrical switch having an actuating means; a spring means disposed for urging said actuating means toward one position, and said movable means being adapted to cause a displacement of said spring means responsive to the penetration of said output surface into the workpiece whereby to cause said actuating means to assume a second position.

7. A sonic apparatus as set forth in claim 1, said movable means being mounted in acoustic isolated relation to said resonator and including biasing means for resiliently biasing said movable means in a direction toward engagement with the workpiece; said control means being an electrical switch coupled to said resonator in fixed relation relative to said output surface, and said control means being actuated responsive to the displacement of said movable means against said biasing means effective thereupon.

8. A sonic apparatus as set forth in claim 1, said means coupled for imparting vibrations including an electrical high frequency generator coupled to a converter unit which provides vibrations to said resonator in response to the electrical energy produced by said generator, and said control means being a switch connected in circuit for interrupting the electrical excitation provided by said generator to said converter unit.

9. A sonic apparatus comprising:
   a generator adapted to provide high frequency electrical energy;
   a converter unit coupled to said generator for receiving said high frequency energy and providing sonic energy responsive to the electrical energy;
   a solid resonator coupled to said converter unit for receiving said sonic energy and providing high frequency vibrations at an output end thereof, said output end being shaped for penetrating responsive to applied force into the surface of a thermoplastic workpiece;
   means coupled to said resonator for being mechanically displaced responsive to the depth of penetration of said output end into the workpiece;
   an electrical switching means disposed for being actuated responsive to the displacement of said means by a predetermined amount, and
   electrical circuit means coupling said switching means to said generator for interrupting said electrical energy when a predetermined displacement of said means coupled to said resonator occurs.

10. A sonic apparatus as set forth in claim 9, and means coupled for adjusting the displacement causing actuation of said switching means.

11. A sonic apparatus as set forth in claim 9, said converter unit being disposed in a manually supportable housing; handle means extending from said housing; a trigger switch having an electrical switch contact associated with said handle means, and said switch contact being coupled serially in circuit with said switching means.

12. A sonic apparatus as set forth in claim 11, said handle means comprising a pair of handles.

References Cited

UNITED STATES PATENTS 3,483,066  12/1969  Harris et al. _____ 156—580
3,493,457  2/1970   Jugler _____ 228—1 X BENJAMIN A. BORCHELT, Primary Examiner J. J. DEVITT, Assistant Examiner U.S. Cl. X.R.

156—73; 228—1